(12) United States Patent
Rainey et al.

(10) Patent No.: US 6,467,361 B2
(45) Date of Patent: *Oct. 22, 2002

(54) STRAIN GAGE SENSOR HAVING AN UNSTRAINED AREA

(75) Inventors: Robert Rainey, Elkhart, IN (US); Patrick B. Blakesley, Elkhart, IN (US); James Newcomer, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/850,774

(22) Filed: May 8, 2001

(65) Prior Publication Data

US 2002/0134167 A1 Sep. 26, 2002

Related U.S. Application Data

(63) Continuation-in-part of application No. 09/813,336, filed on Mar. 20, 2001.

(51) Int. Cl.[7] .................................................. G01L 1/04
(52) U.S. Cl. .................................................. 73/862.637
(58) Field of Search .......................... 73/795, 789, 796, 73/797, 862.044, 862.045, 862.046, 862.637

(56) References Cited

U.S. PATENT DOCUMENTS

| 5,295,386 A | * | 3/1994 | Okada ........................ 73/1.07 |
| 6,244,116 B1 | * | 6/2001 | Osmer et al. ............... 177/136 |
| 6,250,863 B1 | * | 6/2001 | Kamentser et al. ......... 116/212 |
| 6,324,918 B1 | * | 12/2001 | Gitis et al. .................. 177/211 |

* cited by examiner

Primary Examiner—Max Noori
(74) Attorney, Agent, or Firm—Mark P. Bourgeois; Mark W. Borgman

(57) ABSTRACT

A strain gage for measuring an applied force or weight. The strain gage includes a substrate having a tapered center section that is adapted to be stressed in response to the applied force. A strained resistor is mounted on the center section of the substrate. A wing section is attached to the center section. The wing section is adapted to be not stressed by the applied force. An unstrained resistor is mounted on the wing section. A terminal section is mounted to the center section and the wing section.

23 Claims, 2 Drawing Sheets

STRAIN GAGE SENSOR HAVING AN UNSTRAINED AREA

CROSS REFERENCE TO RELATED AND CO-PENDING APPLICATIONS

This application is a continuation in part of U.S. patent applications Ser. No. 09/813,336, filed Mar. 20, 2001 and titled, "Strain gage with integral amplifier".

This application is related to the following U.S. patent applications:

U.S. patent application Ser. No. 09/374,874, filed Aug. 16, 1999 and titled, "Automobile seat weight Sensor".

U.S. patent application Ser. No. 09/374,870, filed Aug. 16, 1999 and titled, "Vehicle Occupant Position Detector and Airbag Control System".

U.S. Pat. No. 6,161,891 issued Dec. 19, 2000 and titled, "Vehicle Seat Weight Sensor".

The foregoing patents have the same assignee as the instant application and are herein incorporated by reference in their entirety for related and supportive teachings.

FIELD OF THE INVENTION

This invention relates to a force sensor or strain gage sensor for detecting the presence of a person having a weight in a car seat, and in particular to a strain gage that can detect the presence of an occupant using strain sensitive resistors and provide an electrical signal to control activation of an airbag.

DESCRIPTION OF THE RELATED ART

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance in response to force which causes dimensional changes of the resistor. An electrical signal changes voltage level as the resistance changes.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate or not at all.

The strain gage resistors are connected in a wheatstone bridge configuration using four resistors. Previous sensors have placed two resistors on the top surface of a substrate and two on the bottom surface of the substrate. When the substrate is stressed, two of the resistors are placed in tension and two in compression. This configuration increases the magnitude of change in the electrical output signal measured across the bridge as the resistance in two of the resistors increases and decreases in the other two resistors. If the four resistors are all placed in tension or compression, the output signal across the bridge only changes by a small magnitude.

Manufacturing a strain gage with resistors on the top and bottom surface of the strain gage adds additional cost and expense as each manufacturing step has to be repeated on both the top and bottom surfaces. Further, when the resistors are placed on different surfaces, the individual characteristics of each resistor are more susceptible to change. For example, when resistors are screened and fired on one surface considerable processing time may pass before the resistors are deposited on another side. During this time the resistor material may run out and a new lot may have to be used, the oven firing profile may change and the equipment used to deposit the resistors may change settings. This may result in resistors with different resistances and temperature performance.

A current unmet need exists for a strain gage sensor that has a large magnitude output signal with resistors on only one surface that is readily manufacturable at a low cost.

SUMMARY OF THE INVENTION

It is a feature of the invention to provide a reliable and cost-effective weight sensor and strain gage for detecting weight.

An additional feature of the invention is to provide a strain gage for measuring a weight applied to the strain gage. The strain gage including a substrate having a center section that is adapted to flex in response to the applied weight. At least one step section is attached to the center section. The center section is located adjacent the step section. The step section is adapted to concentrate the weight applied onto the center section. At least one outer section is attached to the step section. At least one strained resistor is mounted on the center section of the substrate for generating an electrical signal in response to the substrate being stressed. At least one wing section is attached to the center section. The wing section is adapted to be out of a strain path. At least one unstrained resistor is mounted on the wing section.

Another feature of the invention is to provide a strain gage for measuring an applied weight. The strain gage includes a substrate having a tapered center section that is adapted to be stressed in response to the applied weight. At least one strained resistor is mounted on the center section of the substrate. At least one wing section is attached to the center section. The wing section is adapted to be not stressed by the applied weight. At least one unstrained resistor is mounted on the wing section. A terminal section is mounted to the center section and the wing section.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

It is noted that the drawings of the invention are not to scale. The invention will be described with additional specificity and detail through the use of the accompanying drawings. In the drawings like numbering represents like elements between the drawings.

DETAILED DESCRIPTION OF THE PREFERRED EMBODIMENTS

Figure 1:
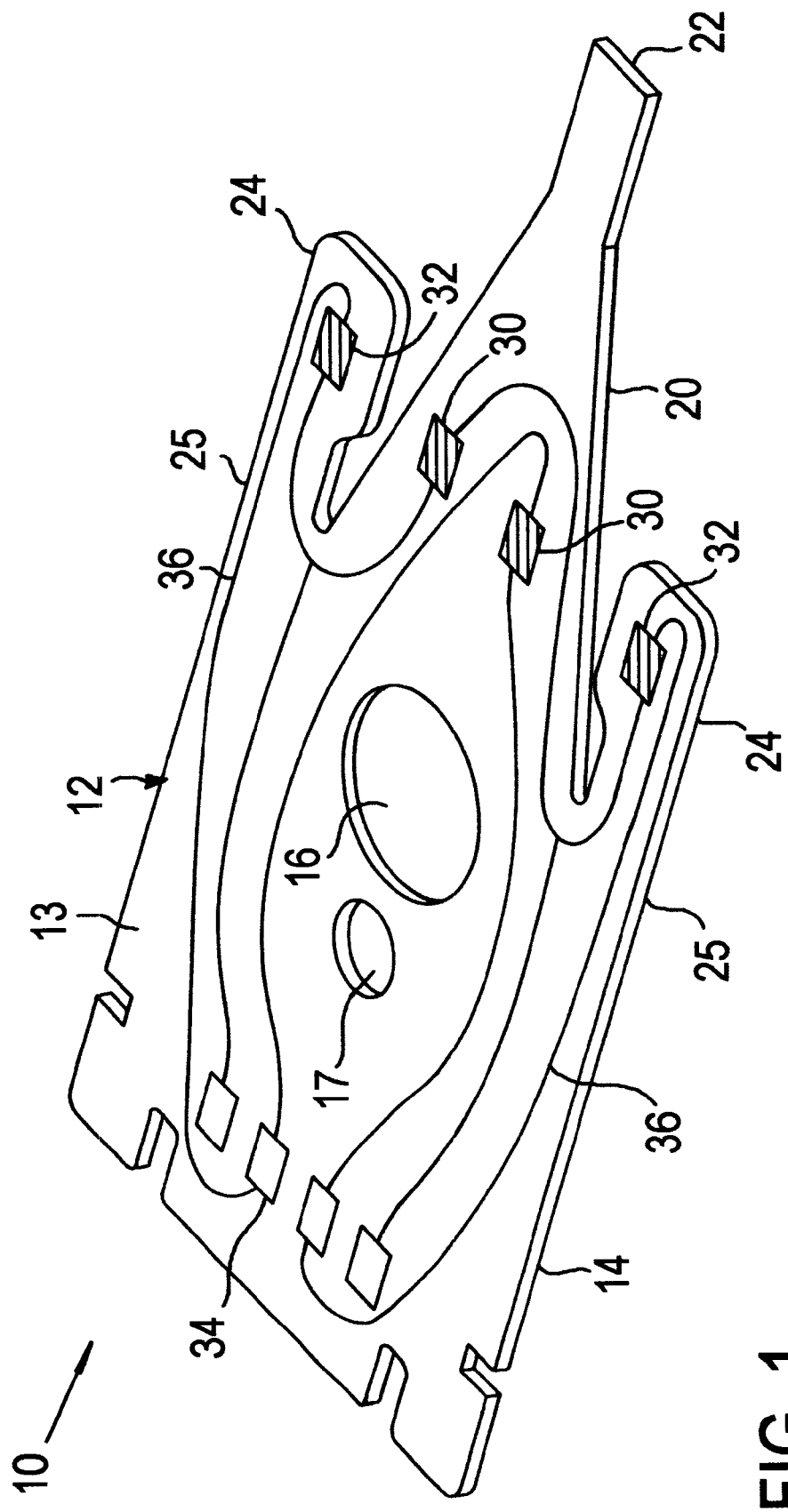
FIG. 1 is a perspective view of the preferred embodiment of a strain gage having an unstrained area.

Referring to FIG. 1, a strain gage sensor 10 is shown. Sensor 10 has a planar metal substrate 12 with an upper surface 13 and a bottom surface 14. Metal substrate 12 is preferably formed from stainless steel. Substrate 12 has a mounting hole 16 and a location hole 17. Hole 16 is used to attach sensor 10 adjacent to a vehicle seat. Hole 17 prevents sensor 10 from twisting after it is mounted. A tapered beam or center section 20 extends away from substrate 12. Center section 20 has an end 22. The force or displacement to be measured would be applied to end 22. Fasteners (not shown) would be used to attach strain gage 10 to a structure that supports a weight or force to be measured. The tapered beam concentrates the force of the weight to be measured causing the beam to slightly flex.

A pair of wing sections 24 are attached by bridges 25 to tapered beam 20. The wing sections 24 are also formed from steel and are preferably stamped at the same time as the rest of substrate 12. The wing sections 24 are located out of the strain or flexing path that affects center section 20. The weight applied to strain gage 10 does not cause the wing sections to flex or have strain therein.

A pair of active or strained gage resistors 30 are arranged on surface 13 on tapered beam 20. An inactive or unstrained gage resistor 32 is mounted on each of wing sections 24. Details of the manufacture and operation of resistors 30 and 32 are contained in U.S. patent application Ser. No. 09/374,874, filed Aug. 16, 1999 and titled, "Automobile seat weight Sensor", which is herein incorporated by reference. Resistors 30 are strain sensitive and will change resistance based on the amount of strain in beam 20. A voltage source (not shown) applies a voltage to resistors 30 and 32. The voltage level across the resistors changes in proportion to the applied strain and produces an electrical output signal. Resistors 30 and 32 are connected in a wheatstone bridge configuration to an external electrical circuit (not shown). Strain gage resistors 30 and 32 are connected by circuit lines 36 to one another and to terminals 34. Terminals 34 can connect with an external wire harness or connector (not shown). Terminals 34 are used to solder to individual wires in a wiring harness. The wiring harness would typically connect with an airbag controller.

Resistors 30 and 32 can also be formed on a ceramic green tape. Such methods of forming resistors on metal substrates are detailed in U.S. Pat No. 4,556,598 titled, "A porcelain tape for producing porcelainized metal substrates", the contents of which are specifically herein incorporated by reference.

There are several advantages from the use of strained resistor 30 and unstrained resistors 32 on the same surface. Having two of the resistors stressed in the wheatstone bridge and two unstressed results in a much larger change in electrical output signal than if all four resistors are in either tension or compression. Having all of the resistors on the same surface is an advantage in several ways. First, all of the resistors can be fabricated at the same time during one screening and firing process. This saves time and reduces cost. Second, the resistors produced are more uniform because they are all done together at the same time so that there are no changes in resistor material, screening parameters or resistor firing parameters. This results in a more uniform resistance and a more uniform temperature coefficient of resistance (change of resistance with temperature).

Figure 2:
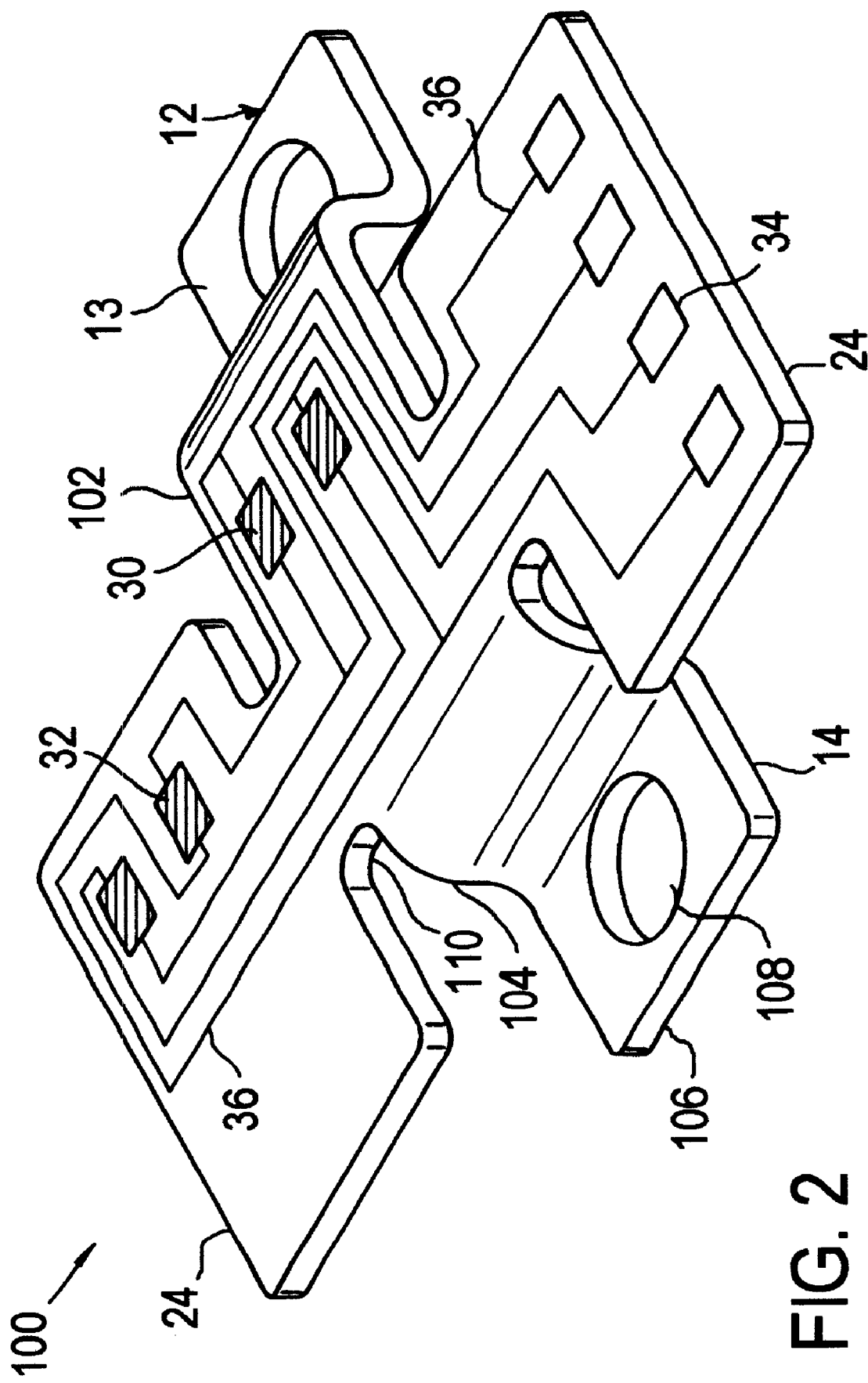
FIG. 2 is a perspective view of an alternative embodiment of a strain gage having an unstrained area.

Referring to FIG. 2, another embodiment of a strain gage sensor 100 is shown. Sensor 100 has a metal substrate 12 with an upper surface 13 and a bottom surface 14. Metal substrate 12 is preferably formed from stainless steel. Substrate 12 has step sections 104 that extends downwardly generally perpendicularly on both sides of a center section 102. A pair of outer flat sections 106 connect with and extend away from step sections 104. Apertures 108 are located in outer sections 106. Fasteners (not shown) would be used to attach strain gage sensor 100 to a structure that supports a weight or force to be measured. The step sections concentrate the force of the weight to be measured onto the center section causing the center section to slightly flex.

A pair of wing sections 24 are attached by bridges 110 to center section 102. The wing sections 24 are also formed from steel and are preferably stamped at the same time as the rest of substrate 12. The wing sections 24 are located out of the strain or flexing path that affects center section 102. The weight applied to strain gage 100 does not cause the wing sections to flex or have strain therein.

A pair of active or strained gage resistors 30 are arranged on surface 13 on center section 102. An inactive or unstrained gage resistor 32 is mounted on one of wing sections 24. A resistor 32 could be mounted on each of wing sections 24. Details of the manufacture and operation of resistors 30 and 32 are contained in U.S. patent application Ser. No. 09/374,874, filed Aug. 16, 1999 and titled, "Automobile seat weight Sensor", which is herein incorporated by reference. Resistors 30 are strain sensitive and will change resistance based on the amount of strain in center section 102. A voltage source (not shown) applies a voltage source to resistors 30 and 32. The voltage level across the resistors changes in proportion to the applied strain and produces an electrical output signal. Resistors 30 and 32 are connected in a wheatstone bridge configuration to an external electrical circuit (not shown). Strain gage resistors 30 and 32 are connected by circuit lines 36 to one another and to terminals 34. Terminals 34 can connect with an external wire harness or connector (not shown). Terminals 34 are used to solder to individual wires in a wiring harness. The wiring harness would typically connect with an airbag controller.

Resistors 30 and 32 can also be formed on a ceramic green tape. Such methods of forming resistors on metal substrates are detailed in U.S. Pat. No. 4,556,598 titled, "A porcelain tape for producing porcelainized metal substrates", the contents of which are specifically herein incorporated by reference.

There are several advantages from the use of strained resistor 30 and unstrained resistors 32 on the same surface. Having two of the resistors stressed in the wheatstone bridge and two unstressed results in a much larger change in electrical output signal than if all four resistors were stressed. Having all of the resistors on the same surface is an advantage in several ways. First, all of the resistors can be fabricated at the same time during one screening and firing process. This saves time and reduces cost. Second, the resistors produced are more uniform because they are all done together at the same time so that there are no changes in resistor material, screening parameters or resistor firing parameters. This results in a more uniform resistance and a more uniform temperature coefficient of resistance (change of resistance with temperature).

While the invention has been taught with specific reference to these embodiments, someone skilled in the art will recognize that changes can be made in form and detail without departing from the spirit and the scope of the invention. The invention should therefore be limited only by the scope of the human imagination. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A strain gage for measuring a force applied to the strain gage, comprising:
   a) a substrate including:
      1) a center section that is adapted to flex in response to the applied weight;
      2) at least one step section attached to the center section, the center section located adjacent the step section, the step section adapted to concentrate the weight applied thereon onto to the center section; and
      3) at least one outer section attached to the step section;
   b) at least one strained resistor, mounted on the center section of the substrate, for generating an electrical signal in response to the substrate being stressed;
   c) at least one wing section attached to the center section, the wing section adapted to be out of a strain path; and
   d) at least one unstrained resistor mounted on the wing section.

2. The strain gage according to claim 1, wherein the strained and unstrained resistors are connected to form a wheatstone bridge.

3. The stain gage according to claim 2, wherein the wheatstone bridge is connected to a signal conditioning electronics mounted on the wing section.

4. The strain gage according to claim 1, wherein the wing section is connected to the center section by a bridge.

5. The strain gage according to claim 1, wherein at least one terminal is mounted on the wing section.

6. A strain gage for measuring a force applied to the strain gage, comprising:
   a) a substrate including:
      1) a center section that is adapted to flex in response to the applied weight;
      2) at least one wing section attached to the center section, the wing section located adjacent the center section; and
      3) a terminal section attached to the wing section and the center section;
   b) at least one strained resistor, mounted on the center section of the substrate, for generating an electrical signal in response to the substrate being stressed; and
   c) at least one unstrained resistor mounted on the wing section.

7. The strain gage according to claim 6, wherein the strained and unstrained resistors are connected to form a wheatstone bridge.

8. The strain gage according to claim 7, wherein the wheatstone bridge is connected to a signal conditioning electronics.

9. The strain gage according to claim 6, wherein the wing section is connected to the center section by a bridge.

10. The strain gage according to claim 6, wherein the center section is tapered.

11. A strain gage for measuring an applied force, comprising:
    a) a gull wing shaped substrate having a center section that is adapted to be stressed in response to the applied force and a pair of outer sections attached to the center section;
    b) at least one strained resistor, mounted on the center section of the substrate;
    c) at least one wing section attached to the center section, the wing section adapted to be not stressed by the applied force; and
    d) at least one unstrained resistor, mounted on the wing section.

12. The strain gage according to claim 11, wherein a step section is attached between the center section and the outer sections, the step sections adapted to concentrate the applied force onto the center section.

13. The strain gage according to claim 11, wherein the wing section is connected to the center section by a bridge.

14. The strain gage according to claim 11, wherein the strained and unstrained resistors are connected to form a wheatstone bridge.

15. A strain gage for measuring an applied weight, comprising:
    a) a substrate having a tapered center section that is adapted to be stressed in response to the applied weight;
    b) at least one strained resistor, mounted on the center section of the substrate;
    c) at least one wing section attached to the center section, the wing section adapted to be not stressed by the applied weight;
    d) at least one unstrained resistor, mounted on the wing section;
    e) a terminal section mounted to the center section and the wing section.

16. The strain gage according to claim 15, wherein the wing section is connected to the center section by a bridge.

17. The strain gage according to claim 15, wherein the strained and unstrained resistors are connected to form a wheatstone bridge.

18. The strain gage according to claim 15, wherein a mounting aperture is located between the terminal section and the center section.

19. A strain gage for measuring an applied force, comprising:
    a) a substrate having a strain bearing section and a non-strain bearing section;
    b) at least one strained resistor, mounted on the strain bearing section, the strained resistor changing resistance in response to the magnitude of the applied force; and
    c) at least one unstrained resistor, mounted on the non-strain bearing section, the unstrained resistor having a substantially constant resistance.

20. The strain gage according to claim 19, wherein the strain bearing section is tapered.

21. The strain gage according to claim 19, wherein the strain bearing section is gull-wing shaped.

22. The strain gage according to claim 19, wherein the strained and unstrained resistors are connected to form a wheatstone bridge.

23. The strain gage according to claim 19, wherein the strain gage is mounted to a vehicle seat for measuring the weight of a seat occupant.

* * * * *